(12) United States Patent
Fan (10) Patent No.: US 10,924,986 B2
(45) Date of Patent: Feb. 16, 2021

(54) METHOD AND DEVICE FOR CONNECTING TO ACCESS POINT IN WIRELESS NETWORK

(71) Applicant: INTERDIGITAL CE PATENT HOLDINGS, Paris (FR)

(72) Inventor: Wei Fan, Beijing (CN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/472,460

(22) PCT Filed: Dec. 21, 2016

(86) PCT No.: PCT/CN2016/111326
§ 371 (c)(1),
(2) Date: Jun. 21, 2019

(87) PCT Pub. No.: WO2018/112800
PCT Pub. Date: Jun. 28, 2018

(65) Prior Publication Data
US 2020/0213936 A1 Jul. 2, 2020

(51) Int. Cl.
*H04W 48/16* (2009.01)
*H04W 48/18* (2009.01)
(Continued)

(52) U.S. Cl.
CPC ........... *H04W 48/16* (2013.01); *H04W 48/18* (2013.01); *H04W 48/20* (2013.01); *H04W 52/0206* (2013.01); *H04W 88/08* (2013.01)

(58) Field of Classification Search
CPC ..... H04W 48/16; H04W 48/18; H04W 48/20; H04W 52/0206; H04W 88/08
See application file for complete search history.

(56) References Cited

U.S. PATENT DOCUMENTS 8,611,268 B1 12/2013 Thandaveswaran
9,078,209 B2 7/2015 Seok
(Continued)

FOREIGN PATENT DOCUMENTS

CN 105101343 11/2015
CN 105979509 9/2016
(Continued)

OTHER PUBLICATIONS

Bhola et al., "Energy Conservation of Access Point Using CAPS Algorithms", IEEE International Conference on Recent Advances and Innovations in Engineering, Jaipur, India, Mar. 9, 2014, pp. 1-6.
(Continued)

*Primary Examiner* — Curtis A Alia
(74) *Attorney, Agent, or Firm* — Volpe Koenig (57) ABSTRACT

The disclosure provides a method for a wireless device to connect to an access point. The wireless device stores a list of access points that the wireless device previously connected to and an indicator indicating if power save mode is supported or not. The method comprises upon determination that there is at least one access point that supports power save mode in the list of access points, transmitting a message including a SSID to change the at least one access point from power save mode into a normal mode and connecting to an access point in the at least one access point.

9 Claims, 7 Drawing Sheets

(51) Int. Cl.
   *H04W 48/20*   (2009.01)
   *H04W 52/02*   (2009.01)
   *H04W 88/08*   (2009.01)

(56) References Cited

U.S. PATENT DOCUMENTS

| | | | |
|---|---|---|---|
| 9,226,228 B2 | 12/2015 | Fang et al. | |
| 2007/0147317 A1* | 6/2007 | Smith | H04W 48/18 |
| | | | 370/338 |
| 2008/0198811 A1 | 8/2008 | Deshpande et al. | |
| 2008/0298333 A1* | 12/2008 | Seok | H04W 8/005 |
| | | | 370/338 |
| 2013/0100819 A1* | 4/2013 | Anchan | H04W 48/20 |
| | | | 370/241 |
| 2013/0148556 A1 | 6/2013 | Manickam et al. | |
| 2014/0192713 A1 | 7/2014 | Park et al. | |
| 2014/0233406 A1* | 8/2014 | Chhabra | H04W 48/16 |
| | | | 370/252 |
| 2014/0269476 A1 | 9/2014 | Weston et al. | |
| 2015/0139207 A1 | 5/2015 | Seok | |
| 2015/0327265 A1 | 11/2015 | Lee et al. | |
| 2016/0044591 A1* | 2/2016 | Pao | H04W 48/12 |
| | | | 370/329 |

FOREIGN PATENT DOCUMENTS

| | | |
|---|---|---|
| EP | 3010289 | 4/2016 |
| EP | 3226623 | 10/2017 |
| WO | WO2012136168 | 10/2012 |
| WO | WO2016095105 | 6/2016 |

OTHER PUBLICATIONS

Palacios et al., "Analysis of an Energy-Efficient MAC Protocol Based on Polling for IEEE 802.11 WLANs", 2015 IEEE International Conference on Communication, Communications QoS, Reliability and Modeling Symposium, London, United Kingdom, Jun. 8, 2015, pp. 5941-5947.

Anonymous, "Part 11: Wireless LAN Medium Access Control (MAC) and Physical Layer (PHY) specifications", IEEE Standard 802.11-2012, Information Technology—Telecommunications and information exchange between systems—Local and metropolitan area networks—Specific requirements, IEEE, New York, NY, USA, Mar. 29, 2012, pp. 1-2793.

* cited by examiner

METHOD AND DEVICE FOR CONNECTING TO ACCESS POINT IN WIRELESS NETWORK

This application claims the benefit, under 35 U.S.C. § 365 of International Application PCT/CN2016/111326, filed Dec. 21, 2016, which was published in accordance with PCT Article 21(2) on Jun. 28, 2018, in English.

TECHNICAL FIELD

The disclosure generally relates to network technology, and more particularly, to a method and a device for connecting to access point in wireless network.

BACKGROUND

Some gateways are embedded with a wireless local area network (WLAN) Access Point (AP) in accordance with the IEEE 802.11 standard. Some power saving solutions are proposed for the gateway, which allow the AP to operate in a sleep mode when there is no active access and wake up when needed. One known power save solution is called a "Wi-Fi scheduler", which can be applied on a residential gateway to allow a user to specify the timeslot to turn on/off the Wi-Fi module.

Another power save solution was disclosed by a U.S. patent application Ser. No. 13/313,924, filed on Dec. 7, 2011, entitled "System And Method For Access Point Power Save", which proposes to save the power of a WiFi AP "automatically" in condition that there is no station associated with the AP. Specifically, when the AP is in power save mode, it will not transmit beacons but only listen to signals. In addition, upon receipt of a trigger event, the AP will resume sending beacons. As described in that patent application, the trigger event, as an example, can be receiving a probe request or receiving an active scan request.

However, in above power save solutions, if the SSID (Service Set Identifier) of an AP is non-hidden, the station of the AP will not send probe requests or active scan for the SSID if there is no saved SSID in service. A non-hidden AP means that the SSID of the AP is contained within a beacon when the station firstly associated with the AP, that is, the SSID is broadcast via the beacon frame of the AP. In this case, the station will not be able to trigger the AP to wake up even though the station is back to the radio area of the AP. The user has to manually input the SSID via a user interface to trigger the probe request for active scan.

In brief, when an AP is in power save mode, it will not transmit beacons but only listen signals. While at the same time, if a SSID of an AP is non-hidden, conventionally when a station is back into the range of the AP, it will not send probe request or active scan request to re-associate with the AP. Therefore, the AP and the station cannot find each other in this context.

Therefore, there is a need for a solution to address the above issue.

SUMMARY

According to an aspect of the disclosure, it provides a method for a wireless device to connect to an access point. The wireless device stores a list of access points that the wireless device previously connected to and an indicator indicating if power save mode is supported or not. The method comprises upon determination that there is at least one access point that supports power save mode in the list of access points, transmitting a message including a SSID to change the at least one access point from power save mode into a normal mode and connecting to an access point in the at least one access point.

According to a variant, the list is further associated with a second indicator indicating if access configuration is manually entered, and the method further comprises: upon determination that there is no access point that supports power save mode in the list of access points and there is at least one access point whose access configuration is manually entered, transmitting a message including SSID of the at least one access point.

According to another variant, the method further comprises: upon determination that at least one access point detected in a passive scan exists in the list of access points, connecting to an access point in the at least one access point detected in the passive scan.

According to another variant, the list is further associated with a position where the wireless device was previously connected to the corresponding access point, the method further comprises: determining an access point, for which a distance between a current position of the wireless device and the position where the wireless device was previously connected to the access point is equal to or smaller than a threshold; and transmitting a message including the SSID of the access point to the access point to change the access point from power save mode into a normal mode.

According to another variant, the SSID is a wildcard SSID.

According to another aspect of the disclosure, it provides a wireless device for connecting to an access point. It comprises a transceiver; a storage that is used to store a list of access points that the wireless device previously connected to and an indicator indicating if power save mode is supported or not, at the wireless device and a processor. The processor is used to upon determination that there is at least one access point that supports power save mode in the list of access points use the transceiver to transmit a message including a SSID to change the at least one access point from power save mode into a normal mode and connect to an access point in the at least one access point.

According to a variant, the list is further associated with a second indicator indicating if access configuration is manually entered, wherein the processor (702) is further configured to, upon determination that there is no access point that supports power save mode in the list of access points and there is at least one access point whose access configuration is manually entered, use the transceiver (701) to transmit a message including SSID of the at least one access point.

According to another variant, the processor (702) is further configured, to upon determination that at least one access point detected in a passive scan exists in the list of access points, use the transceiver (701) to connect to an access point in the at least one access point detected in the passive scan.

According to another variant, the list is further associated with a position where the wireless device was previously connected to the corresponding access point, and the processor (702) is further configured to determine an access point, for which a distance between a current position of the wireless device and the position where the wireless device was previously connected to the access point is equal to or smaller than a threshold; and wherein the transceiver (701) is configured to transmit a message including the SSID of the access point to the access point to change the access point from power save mode into a normal mode.

According to another variant, the SSID is a wildcard SSID.

According to another aspect of the disclosure, it provides a computer program comprising program code instructions executable by a processor for implementing above methods.

According to another aspect of the disclosure, it provides a computer program product that is stored on a non-transitory computer readable medium and comprises program code instructions executable by a processor for implementing above methods.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure are described below with reference to the drawings. It should be noted that the following embodiments are illustrative only, rather than limiting the scope of the disclosure. Detailed description of any well-known steps, devices, components and the like is omitted here to avoid obscuring of the disclosure.

An embodiment of the present disclosure provides a method for power management of access point in wireless network.

According to the method of the embodiment, a station which is associated with an AP will receive a message from the AP, indicating the power save capability of the AP. The message can be contained in a beacon frame and a probe response frame. The message is represented within the extended capabilities element in the beacon frame and probe response frame body with an information element "Extended Capabilities". The Extended Capabilities element is optionally present if any of the fields in this element are nonzero. The information element is further defined within the IEEE 802.11-2012 section 8.4.2.29 "Extended Capabilities element". Bit 50 from the reserved bits of this element can be utilized to indicate whether the AP supports power save mode or not, as shown in Table 1 below. The details of a beacon frame and probe response frame can be referenced in IEEE 802.11-2012 section 8.3.3.2 and 8.3.3.9.

TABLE 1

Extended Capabilities Information Element for AP power save mode

| Bit | Information | Notes |
| --- | --- | --- |
| 50 | AP Power Save Support | When the AP support power save mode, set this bit to 1, otherwise set to 0. |

Figure 1:
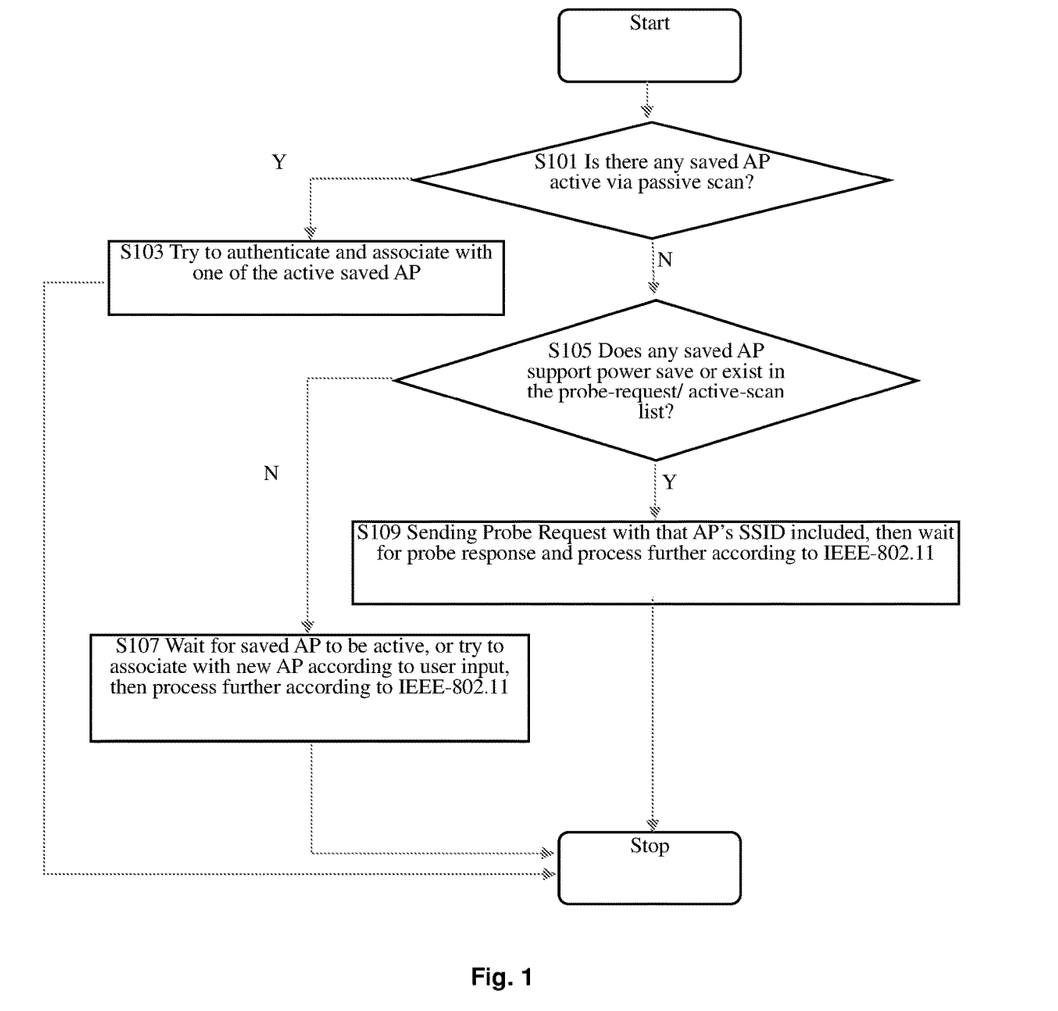
FIG. 1 is a flowchart illustrating a method for a wireless station to wake up an AP in power save mode according to a first embodiment of the disclosure.

FIG. 1 is a flowchart illustrating a method for a wireless station to wake up an AP in power save mode according to a first embodiment of the disclosure.

As shown in FIG. 1, at step S101, in a passive scan, the wireless station detects beacon frames from AP(s), and determines whether there is an active AP that is previously associated with the wireless station. The information of the previously associated AP can be stored in a non-volatile memory of the wireless station in advance, for example, in the form of a list of SSID names. It means that once the wireless station associates with a new AP, it stores information about the new AP, e.g. SSID in the list.

If an active AP, which is previously associated with the wireless station, is detected, at step S103, the wireless station will associate with the detected AP after authentication. It is appreciated that more than one previously associated AP may be detected, in which case the wireless station can select one of them for association.

If no active AP, which is previously associated with the wireless station, is detected, at step S105, the wireless station will determine whether there is a previously associated AP that operates in power save mode or exists in a probe-request/active scan list. It shall be noted that all these information is stored in a non-volatile storage of the wireless station. As to the list of APs that operates in power save mode, after the wireless station determines that an AP works in power save mode from the beacon frame or the probe response frame, it stores such information in a table for power-save-mode APs. The table has at least one fields of SSID (Service Set Identifier) of the APs. As to the probe-request/active scan list, it can also be organized in the form of table. The table stores a list of APs whose SSIDs are manually entered by the users. In some cases, encryption keys are also entered by the users and stored in the table by the wireless station. It shall be noted that besides an AP whose SSID is broadcast, the AP can also be an AP whose SSID is not broadcast (i.e. hidden SSID).

If the determination of the step S105 is "No", at step 107 the wireless station will wait for a previously associated AP to become active, or associate with an AP according to an input from a user.

If the determination of the step S105 is "Yes", at step 109 the wireless station will send a probe request including the SSID of the AP to the AP in order to wake up the AP from power save mode. It is appreciated that, when receiving a probe response from the AP, the wireless station will associate with the AP according to IEEE-802.11 standard.

According to the process shown in FIG. 1, if the wireless station wants to associate with an AP but there is no active AP found by passive scan, the wireless station can check whether it was once associated with an AP that supports power save mode (indicated for example by a beacon frame or a probe response frame) or exists in a list in which APs' SSID are manually entered. If there is such an AP, then the wireless station can send a probe request including the SSID of the AP to wake up the AP, without waiting for the SSID that was broadcast in the original beacon of the AP. The above-mentioned problem that the AP and the station cannot find each other is addressed.

With the method shown in FIG. 1, a wireless station can associate with an AP in power save mode that was previously associated by sending out a probe request including the SSID of the AP. However, the wireless station does not know the exact moment to send the probe request to the AP in power save mode. A possible result is that the station keeps probing the SSID of the AP if there is no active AP, which may leak the SSID information.

Figure 2:
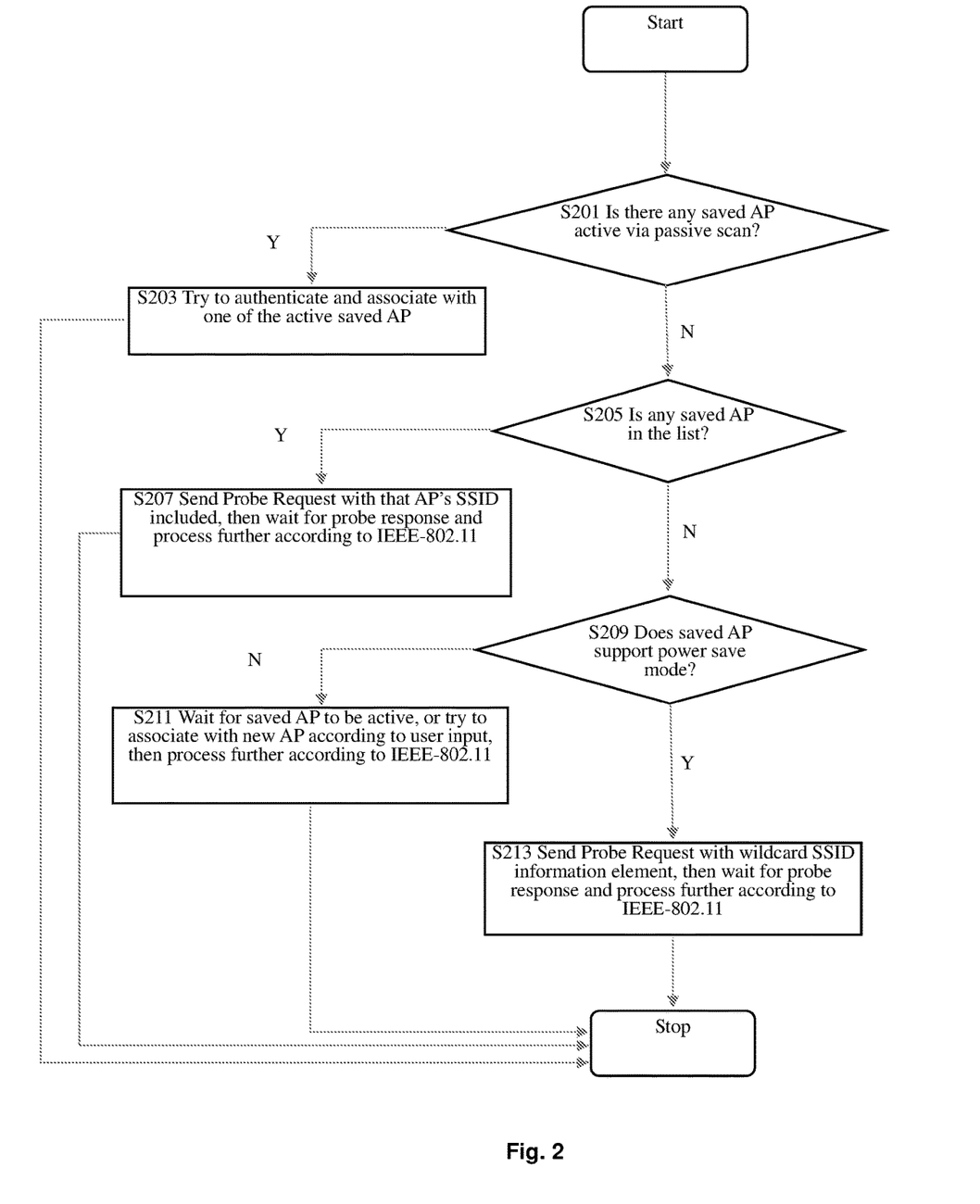
FIG. 2 is a flowchart illustrating a method for a wireless station to wake up an AP in power save mode according to a second embodiment of the disclosure.

FIG. 2 is a flowchart illustrating a method for a wireless station to wake up an AP in power save mode according to a second embodiment of the disclosure. Compared to the first embodiment as shown in FIG. 1, it separates the step S105 into S205 and S209. For APs that are manually entered, the wireless station sends AP's SSID. For APs that was previously connected and supports power save mode, the wireless station sends a wildcard SSID. Below is detailed description about FIG. 2.

As shown in FIG. 2, at step S201, the wireless station detects by a passive scan whether there is an active AP that is previously associated with the wireless station. The information of the previously associated AP can be stored by the wireless station in advance.

If an active AP that is previously associated with the wireless station is detected, at step S203, the wireless station will associate with the detected AP after authentication. It is appreciated that more than one previously associated AP may be detected, in which case the wireless station can select one of them for association.

If no active AP that is previously associated with the wireless station is detected, at step S205, the wireless station will determine whether there is any stored AP in the probe request/active scan list.

If the determination of the step S205 is "Yes", at step S207, the wireless station will send a probe request including the SSID of the AP for each AP in the list. The wireless station does not need to send the request for all APs. It can stop when the wireless station successfully connects to an AP. When receiving a probe response from the AP, the wireless station will associate with the AP according to IEEE-802.11 standard.

If the determination of the step S205 is "No", at step S209, the wireless station will determine whether there is a previously associated AP that operates in power save mode.

If the determination of the step S209 is "No", at step 211 the wireless station will wait for a previously associated AP to become active, or associate with an AP according to an input from a user.

If the determination of the step S209 is "Yes", at step 213, the wireless station will send a probe request including the wildcard SSID of the AP. A wildcard SSID is a SSID whose uSSIDLength member is set to zero. When the desired SSID is set to the wildcard SSID, the wireless station can connect to any BSS (Basic Service Set) network. Further details of wildcard SSID can be obtained from IEEE 802.11-2012, section 8.4.2.2. When receiving a probe response from the AP, the wireless station will associate with the AP according to IEEE-802.11 standard.

In the method described above with reference to FIG. 2, in order to wake up an AP in power save mode, the station does not send a probe request including the specific SSID. It will apply a wildcard SSID.

At the side of an AP, when the AP is successfully associated with a station, it will store the MAC address of the station for example in its local non-volatile storage. If the AP is in power save mode, it will wake up upon receipt of a probe request sent from one of the saved MAC list with a matched SSID (including wildcard SSID or empty SSID) included.

Figure 3:
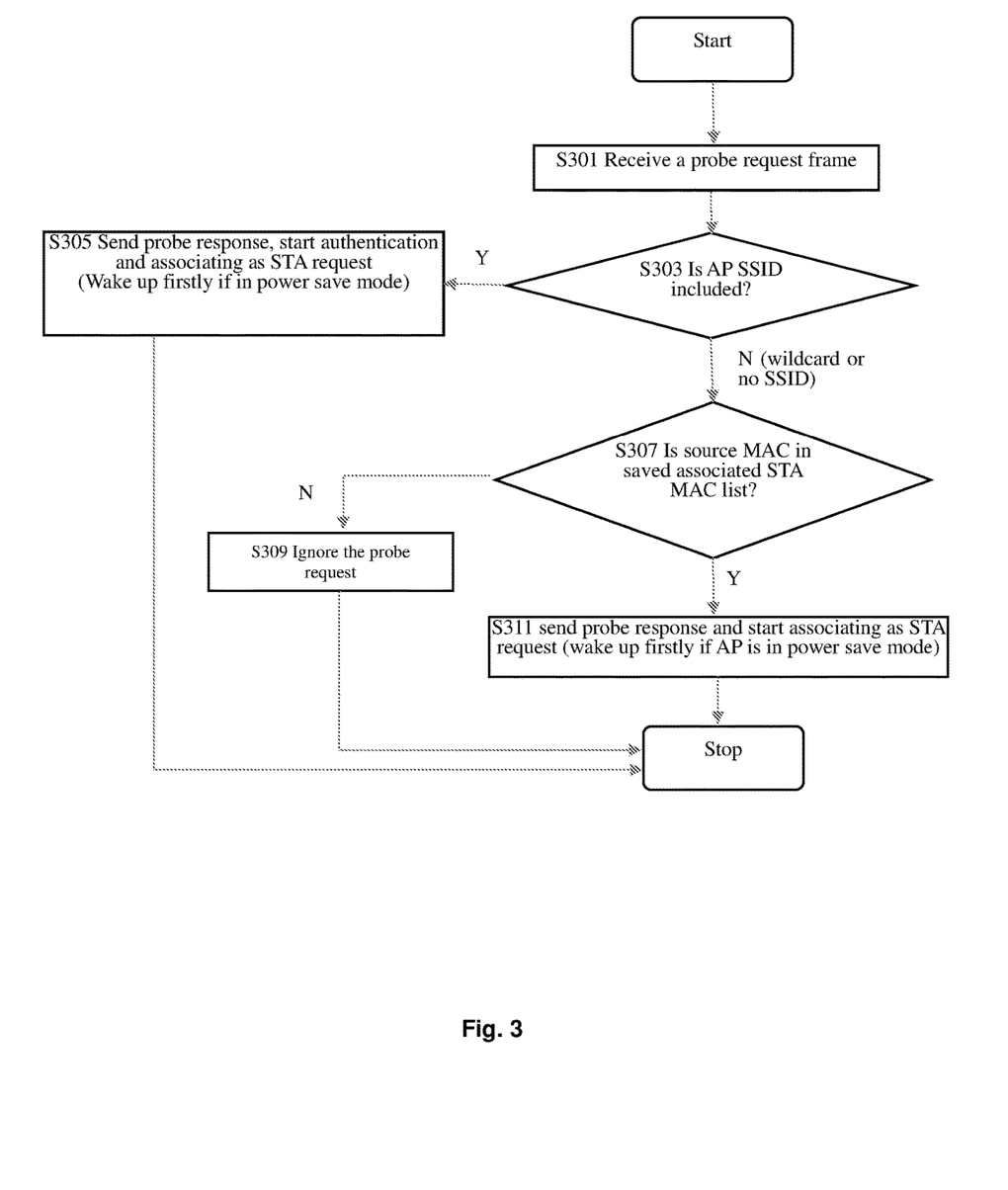
FIG. 3 is a flowchart illustrating a method for an AP in power save mode to respond to the probe request of a wireless station according to the second embodiment of the disclosure.

FIG. 3 is a flowchart illustrating a method for an AP in power save mode to respond to the probe request of a wireless station according to the second embodiment of the disclosure.

As shown in FIG. 3, at step S301, the AP in power save mode receives a probe request frame from a wireless station.

At step S303, the AP determines whether the SSID of the AP is included in the probe request frame.

If the SSID of the AP is included in the probe request frame, at step S305, the AP will wake up and associate with the wireless station. It is appreciated that the process for association may include a response to the probe request frame and needed authentication.

If the SSID of the AP is not included in the probe request frame (for example, it is wildcard SSID or there is no SSID included), at step S307, the AP will determine whether the source MAC of the probe request frame is in a MAC list of the previously associated wireless station.

If the determination of the step S307 is "No", at step S309, the wireless station will ignore the probe.

If the determination of the step S309 is "Yes", at step 311 the AP will wake up and associate with the wireless station. It is appreciated that the process for association may include a response to the probe request frame and needed authentication.

According to the above method of the second embodiment, the wireless station does not need to send a probe request at all time, which will prevent the SSID information from leaking. In addition, the AP can wake up and only respond to probe request with matched wildcard SSID. It shall be noted that in the above method the AP will be waken up when any of below conditions is met including a) SSID conveyed in the probe request is the same as the AP's SSID; and b) the source MAC address of the probe request exists in the stored MAC address list.

The MAC address list saved in the AP can be removed if the SSID of the AP is removed or changed. This MAC address should not be removed if the AP's authentication method or authentication key is changed while SSID name is unchanged.

If power save mode was indicated as 'support' in the AP's beacon frame (as defined in Table 1) or probe response, after the wireless station has been successfully associated with the AP for the first time, the wireless station saves or stores the SSID of the AP in a non-volatile storage and marks that the AP supports power save mode. If the wireless station cannot find any active AP in its saved AP list via passive scan, it determines whether there is AP in its saved AP list that supports power save mode or the SSID of the AP is hidden. If the SSID of the AP is hidden, which means the wireless station did not receive a broadcasted beacon frame from that AP with its SSID included, the wireless station will send a probe request including the specific SSID of the AP. If the SSID of the AP is not hidden, which means that the wireless station once received a broadcasted beacon frame from that AP with its SSID included and the AP supports power save mode, then the wireless station will send a probe request with a wildcard SSID or without including SSID.

In the case that the AP does not support power save mode nor its SSID is not hidden, the AP will send broadcasted beacon as long as it is active.

In the process described with reference to FIG. 2, it assumes that an AP with hidden SSID can only respond to a probe request when the SSID is specified in the probe request frame. However, an AP with hidden SSID can also respond to a probe request if the MAC of the wireless station is in the MAC list saved by the AP. Then, if the process described with reference to FIG. 2 is applied to an AP with hidden SSID, the wireless station can also send a probe request with wildcard SSID or without SSID element.

In this case, when an AP receives a probe request without SSID element or with wildcard SSID (A SSID field of length 0 is used within Probe Request management frames to indicate the wildcard SSID, as defined in IEEE 802.11-2012 section 8.4.2.2 "SSID element"), the AP will check whether the frame source MAC is in the MAC list of previously associated wireless station. If the source MAC is in the list, the AP will wake up firstly from power save mode and send a probe response accordingly.

Besides probe request or active scan, the message sent from wireless station can also be in any other form that is further defined and recognized by the AP. As long as the message contains the MAC of the wireless station and indication to trigger the AP to wake up, then if the AP receives the message and the source MAC is in the above-described list, the AP will wake up from power save mode.

Figure 4:
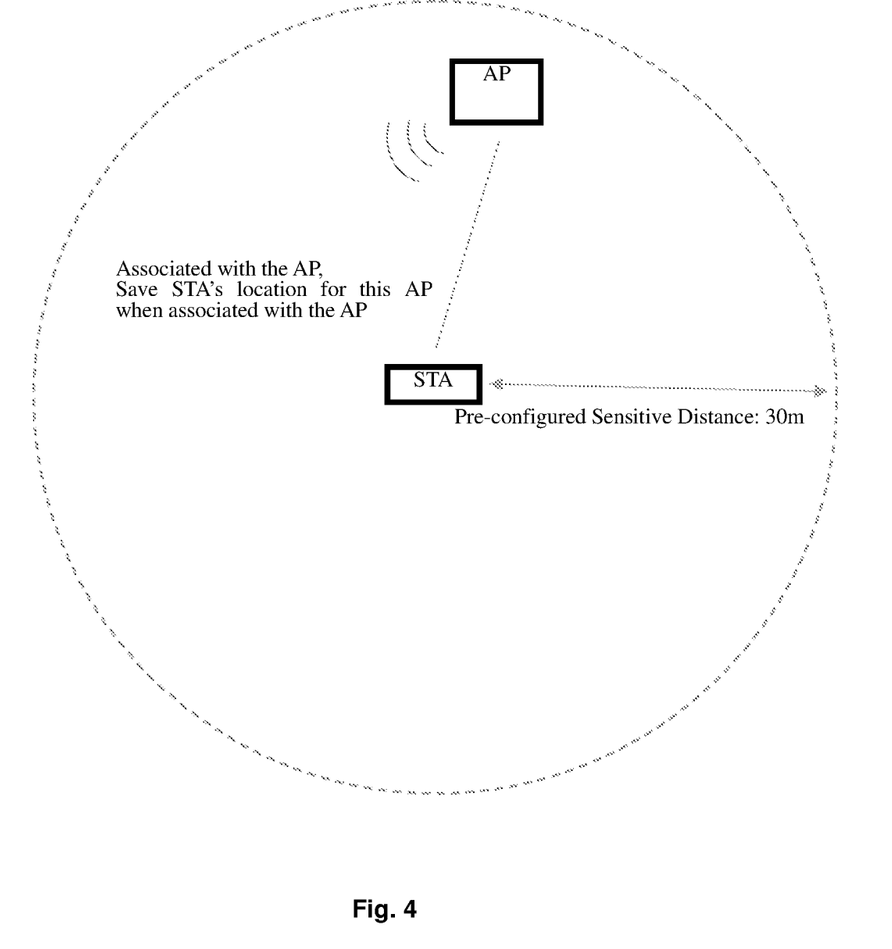
FIG. 4 is a schematic diagram showing a wireless station determining and storing the position information of association with an AP according to a third embodiment of the disclosure.

It is possible that a wireless station supports localizing technologies, such as global positioning system (GPS) and mobile localization. In this case, when the wireless station is associated with an AP, the wireless station can determine its position at that moment and save the physical position information, for example, in the wireless station's non-volatile storage together with the SSID of the associated AP, indicating that this position is in the radio area of the AP. A distance value, for example 30 meters, can be configured or pre-specified to indicate the sensitive or available area for the wireless station to start probing the SSID of the AP. FIG. 4 is a schematic diagram showing a wireless station determining and storing the position information of association with an AP according to the third embodiment of the disclosure.

Figure 5:
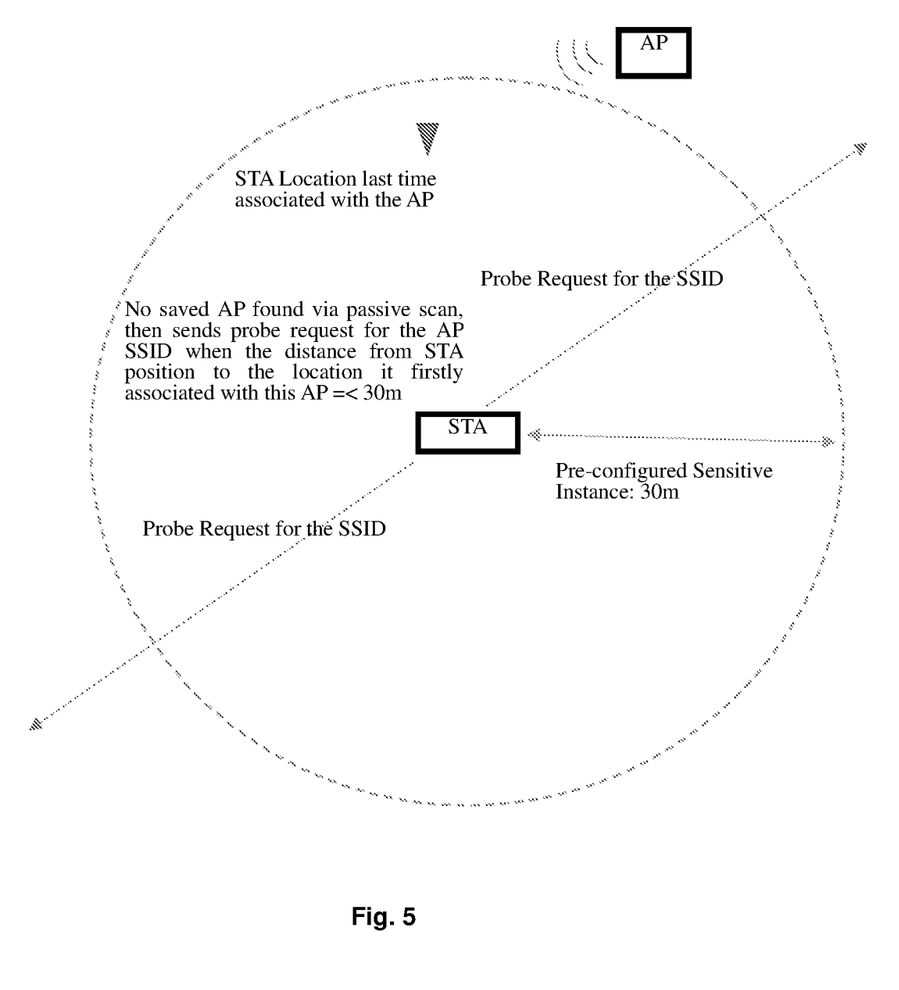
FIG. 5 is a schematic diagram showing a wireless station sending a probe request to an AP for association depending on the location information according to the third embodiment of the disclosure.

If the wireless station is not associated with any AP and does not find any AP in the saved AP list via passive scan, the wireless station will determine whether there is an AP in its saved AP list supporting power save mode. If yes, the wireless station will determine whether the distance from its current position to the position where it was firstly associated with the AP equals or is less than a predetermined value. If yes, the wireless station will send a probe request with the including the SSID of the AP. FIG. 5 is a schematic diagram showing a wireless station sending a probe request to an AP for association depending on the location information according to the third embodiment of the disclosure.

This method does not depend on the ability of the AP to check the source MAC in received message, which is more feasible and applicable for such wireless station as smart phone. However, the implementation of this process assumes that the AP is in a fixed place or at least will not change its position too far. This assumption is especially applicable for the scenario of a residential gateway/AP. The saved position of the station when associated with the AP needs to be updated each time when it is successfully associated with the AP.

Figure 6:
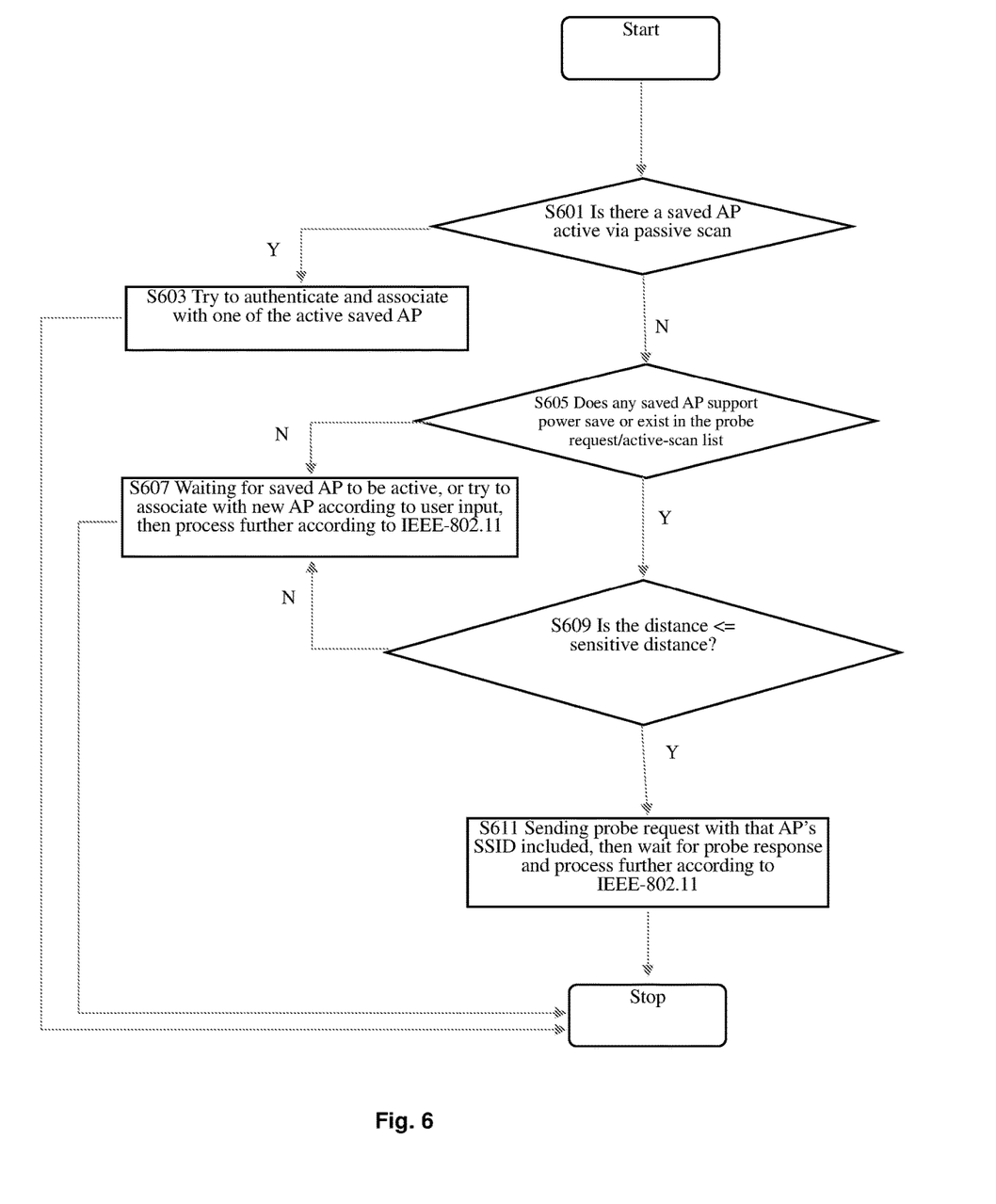
FIG. 6 is a flowchart illustrating a method for a wireless station to trigger an AP in power save mode according to the third embodiment of the disclosure.

FIG. 6 is a flowchart illustrating a method for a wireless station to trigger an AP in power save mode according to the third embodiment of the disclosure. Compared to the first embodiment, it adds a further limitation on a distance from a wireless station's current position to a position where it previously connects to an AP.

As shown in FIG. 6, at step S601, the wireless station detects by a passive scan whether there is an active AP that was previously associated with the wireless station.

If an active AP that was previously associated with the wireless station is detected, at step S603, the wireless station will associate with the detected AP after authentication. It is appreciated that more than one previously associated AP may be detected, in which case the wireless station can select one of them for association.

If no active AP that was previously associated with the wireless station is detected, at step S605, the wireless station will determine whether there is a previously associated AP that operates in power save mode or exists in a probe-request/active scan list.

If the determination of the step S605 is "No", at step S607, the wireless station will wait for a previously associated AP to become active, or associate with an AP according to an input from a user.

If the determination of the step S605 is "Yes", at step S609, the wireless station will determine whether the distance from its current position to the position where it was firstly associated with the AP equals or is less than a predetermined value.

If the determination of the step S609 is "Yes", at step S611, the wireless station will send a probe request including the SSID of the AP. When receiving a probe response from the AP, the wireless station will associate with the AP according to IEEE-802.11 standard.

If the determination of the step S609 is "No", the wireless station will return to step S607 wherein the wireless station will wait for a previously associated AP to become active, or associate with an AP according to an input from a user.

An AP is very likely to operate in a power save mode. For example, a home AP is always powered on. However, in daytime, if nobody is at home and there is no active wireless station, the home AP will go to power save mode without sending a beacon frame.

With the method of the first embodiment, when someone goes back home with her/his Wi-Fi enabled smartphone (wireless station), since no available SSID is available to use by passive scanning, the wireless station will send a probe request including the SSID of the AP since the wireless station knows that SSID support power save mode. This may be indicated in the beacon frame of the AP when previously associating with the wireless station. The AP will then power up upon receiving the trigger event and send a probe response to the station.

With the method of the second embodiment, when someone goes back home with her/his WiFi enabled smartphone (wireless station), since no available SSID is available to use by passive scanning, the station will send a probe request with wildcard SSID to the AP. The AP, which receives this probe request, will determine whether the frame source MAC is in a MAC list of wireless stations, which were previously associated. When the AP determines that its "owned" wireless station requests for association, it will recover from power save mode and send probe response to the wireless station.

With the method of the third embodiment, when someone goes back home with her/his smartphone Wi-Fi enabled (wireless station), since no available SSID is available to use by passive scanning, the wireless station will localize its current position and calculate its distance to the location where it was associated with the AP last time. If the distance for the AP is in the sensitive area, the station will then send the probe request to the SSID. Herein, the sensitive area is defined by a center and a radius. The center is the position where wireless station was associated with AP last time. The radius is a predetermined value. Upon receipt of the probe request, the AP will recover from power save mode and send probe response to the wireless station.

It shall be noted that step order in each of the first embodiment, the second embodiment and the third embodiment features may be changed in the implementation, and features in the first embodiment, the second embodiment and the third embodiment can be combined and/or replaced. For example, in an implementation, step 205 is removed. In addition, a person skilled in the art can change the order of determining stored APs in passive scan, determining stored APs whose access configuration is manually entered, determining stored APs that support power save mode and determining a new AP in the specific implementation.

It shall also be noted that in some implementations, there is only one list of APs to which the wireless station has successfully connected, and the list has additional data fields indicating if an AP supports power save mode and if AP access configuration (e.g. SSID, encryption keys etc.) is manually entered by a user.

It shall also be noted that in some implementations, the wireless station first determines if the stored list has one or more APs that support power save mode before the passive scan S101, S201, and S601. If at least one AP that supports power save mode exist, the wireless station sends wildcard SSID to wake up and connect to the AP. Because the AP exists in the stored list, it means the wireless station previously successfully connected to the AP, and the AP has stored the MAC address of the wireless station. If there are two or more APs that support power save mode, the two or more APs will be waken up. The wireless station selects one AP with the strongest signal strength among the two or more APs. However, in other examples, the wireless station randomly selects an AP, or selects an AP in a prioritized list.

In the present disclosure, the wireless station can be any portable device that supports 802.11 standards, e.g. a mobile phone, a tablet, a laptop etc.

Figure 7:
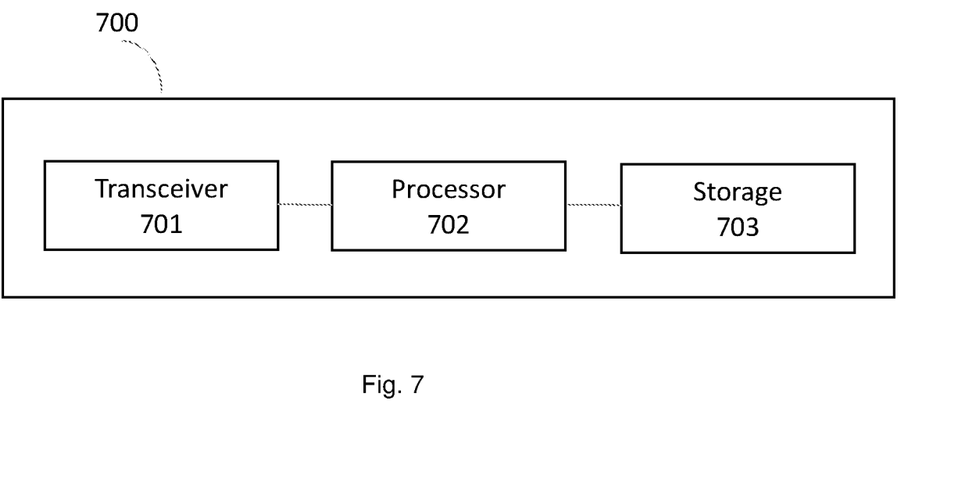
FIG. 7 is a block diagram of a wireless station according to an embodiment of the disclosure.

The present disclosure may be implemented by a computer program product, for example, in the form of a computer-readable medium carrying computer program codes structured in computer program modules. The computer program modules, when executed in a processor, cause the wireless station and the AP to perform the actions described above in conjunction with the figures mentioned above. Alternatively, at least one of the code means may be implemented at least partly as hardware circuits. As FIG. 7 shows, the wireless station 700 comprises a hardware transceiver 701 that is used to send and receive Wi-Fi signals, a processor 702 and a storage 703 that is used to store data, e.g. the list of APs.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. For example, the computer program product may be a flash memory, a Random-access memory (RAM), a Read-Only Memory (ROM), or an EEPROM, and the computer program modules described above could be distributed on different computer program products in the form of memories in alternative embodiments.

The disclosure has been described above with reference to embodiments thereof. It should be understood that various modifications, alternations and additions could be made by those skilled in the art without departing from the spirits and scope of the disclosure. Therefore, the scope of the disclosure is not limited to the above particular embodiments but only defined by the claims as attached.

The invention claimed is:

1. A method comprising at a wireless device:
    storing a list of access points that the wireless device was previously connected to, a first indicator indicating if a power save mode is supported or not and a second indicator indicating if access configuration is manually entered,
    in case there is at least one access point in the list that supports power save mode or which access configuration has been manually entered, transmitting a message including a Service Set Identifier, SSID, of the at least one access point of the list, to change the at least one access point from power save mode into a normal mode; and
    connecting to the at least one access point.

2. The method according to claim 1, further comprising:
    in case at least one access point detected in a passive scan exists in the list of access points, connecting to the at least one access point detected in the passive scan.

3. The method according to claim 1, wherein the list further comprises a position where the wireless device was previously connected to a corresponding access point, and wherein the message is transmitted to an access point for which a distance between a current position of the wireless device and the position where the wireless device was previously connected to the access point is equal to or smaller than a value.

4. The method according to claim 1, wherein the SSID is a wildcard SSID.

5. A wireless device, comprising:
    a storage configured to store a list of access points that the wireless device was previously connected to, a first indicator indicating if a power save mode is supported or not and a second indicator indicating if access configuration is manually entered;
    a processor that is configured to:
    in case there is at least one access point in the list that supports power save mode or which access configuration has been manually entered, transmit a message including a SSID of the at least one access point of the list, to change the at least one access point from power save mode into a normal mode, and
    connect to the at least one access point.

6. The wireless device according to claim 5, wherein the processor is further configured to, in case at least one access point detected in a passive scan exists in the list of access points, use the transceiver to connect to the at least one access point detected in the passive scan.

7. The wireless device according to claim 5, wherein the list further comprises a position where the wireless device was previously connected to a corresponding access point, wherein the message is transmitted to an access point for which a distance between a current position of the wireless device and the position where the wireless device was previously connected to the access point is equal to or smaller than a value.

8. The wireless device according to claim 5, wherein the SSID is a wildcard SSID.

9. A non-transitory computer readable storage medium storing program code instructions executable by a processor for implementing a method comprising:
    storing a list of access points that the wireless device was previously connected to, a first indicator indicating if a power save mode is supported or not and a second indicator indicating if access configuration is manually entered, in case there is at least one access point in the list that supports power save mode or which access configuration has been manually entered, transmitting a message including a Service Set Identifier, SSID, of the at least one access point of the list, to change the at least one access point from power save mode into a normal mode; and connecting to the at least one access point.

\* \* \* \* \*